United States Patent Office 3,478,095
Patented Nov. 11, 1969

3,478,095
PREPARATION OF PHOSPHONAMIDES
Henri Marie Normant, Paris, France, assignor to Rhone-Poulenc S.A., Paris, France, a French body corporate
No Drawing. Filed Dec. 15, 1966, Ser. No. 601,867
Claims priority, application France, Dec. 17, 1965, 42,857
Int. Cl. C07c 9/44; A01n 9/36
U.S. Cl. 260—551                      5 Claims

ABSTRACT OF THE DISCLOSURE

The invention provides a process for making phosphonamides by contacting a reactive organic ester with a cooled aged solution of an alkali metal in a triaminophosphine oxide.

---

This invention relates to the preparation of phosphonamides.

It is known [Normant et al., B1 (1965), p. 1561] that alkali metals such as lithium, sodium and potassium dissolve readily in hexamethylphosphorotriamide (also called tris(dimethylamino)phosphine oxide, or in abbreviated form HMPT) to give blue solutions containing radical anions:

$$M^+[O\doteq P\{N(CH_3)_2\}_3]^-$$

and capable of acting:

(a) As basic or nucleophilic reactants by displacing the mobile hydrogen atoms, and (b) As reducing agents, by giving up their free electrons. It is also known that these solutions are rather unstable.

It has now been found that these solutions give on ageing, which may be accelerated by heating, a compound capable of reacting with suitable organic esters with the formation of phosphonamides.

The present invention provides a process for the preparation of phosphonamides of the general formulae:

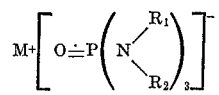

and

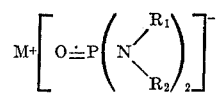

in which R and R' are organic radicals free from substituents reactive under the conditions of the reaction and R' is such as to activate a methylene group attached thereto, and $R_1$ and $R_2$ are organic radicals free from substituents reactive under the conditions of the reaction, which may be joined to form with the adjacent nitrogen a heterocyclic radical, which comprises reacting a reactive ester of the formula:

R—X                  III

R'—CH$_2$—X            IV respectively, in which X represents a halogen atom, e.g. chlorine or bromine, or a sulphuric or sulphonic ester residue, e.g. methanesulphonyloxy, ethanesulphonyloxy or toluene-p-sulphonyloxy, and R and R' are as hereinbefore defined, with an aged solution of an alkali metal in a tri-aminophosphine oxide of the formula:

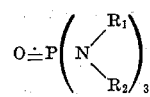

in which $R_1$ and $R_2$ are as hereinbefore defined.

Generally speaking $R_1$ and $R_2$ are lower alkyl, e.g. methyl in HMPT itself, or together with the adjacent nitrogen represent pyrrolidino or piperidino. R and R' may represent a wide variety of radicals. For example, R may represent an alkyl radical (e.g. of 1 to 10 carbon atoms), or an aralkyl radical such as, for example, phenylethyl. Suitable radicals R' which activate the adjacent methylene group are phenyl, vinyl, or vinyl substituted by alkyl of 1 to 7 carbon atoms.

The present invention also relates to the phosphonamides themselves when they are new. These phosphonamides are useful as agricultural pesticides.

In practice, the new process is carried out as follows. An alkali metal (M) is dissolved in a triaminophosphine oxide, for example HMPT, by heating (for example, at about 50–80° C.) to accelerate the dissolution and ageing, i.e. the conversion of the compound of the formula:

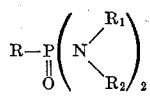      VI which is assumed to be formed in a first phase. At such temperatures the ageing of the solution is substantially complete by the time all the alkali metal has dissolved, e.g. after 1 hour of heating. It is believed that the ageing of the compound of Formula VI leads to a compound of the formula:

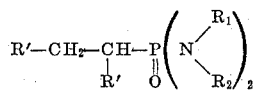      VII in which M represents an alkali metal atom and $R_1$ and $R_2$ are as previously defined, and that the subsequent reaction proceeds in accordance with a reaction mechanism such as the following:

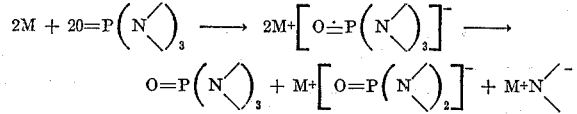

or

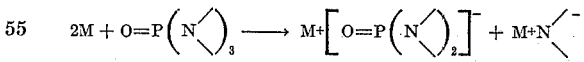

Theoretically, in accordance with this scheme, 2 gram-atoms of alkali metal are required for each mol of triaminophosphine oxide. In practice, however, an excess of triaminophosphine oxide is ordinarily employed, e.g. up to 5 mols per gram-atom of alkali metal. In addition it is advantageous to dilute the medium, before the alkali metal is added, by adding a small quantity of organic diluent which is inert under the operating conditions. Ethers, especially tetrahydrofuran, are suitable diluents.

When all the alkali metal has been reacted, a moist crystalline mass is obtained to which is added the compound of Formula III or IV, optionally diluted with an organic solvent which is inert under the operating conditions, for example an ether.

When the reactive ester employed is a compound of the Formula III having no reactive methylene group, the phosphonamide formed is of the Formula I and an amine of the formula:

is formed at the same time. When however the reactive ester is of Formula IV and contains a reactive methylene group, a phosphonamide of Formula II is obtained, ordinarily in admixture with a proportion of a phosphonamide of formula:

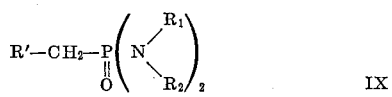

and an amine of the formula:

is formed at the same time. The proportion of the compounds of Formula IX and X is lower as the reactivity of the methylene group increases.

The proportion of reactive ester employed is generally such that there is 1 mol of ester of Formula III or IV to a quantity of aged solution formed using 1 gram-atom of the alkali metal.

The addition of the compound of Formula III or IV to the aged solution of alkali metal in the triaminophosphine oxide is preferably made at low temperature (0° C. and below, e.g. to −60° C.). The phosphonamides formed are then isolated by application of conventional techniques, e.g. fractional distillation and/or crystallization.

The following examples illustrate the invention.

EXAMPLE 1

To a mixture of 0.2 mol of HMPT and 5 to 10 cc. of tetrahydrofuran, 0.1 gram-atom of potassium is added, and the mixture is then heated at about 60° C. until the potassium completely disappears. After cooling to 0° C., a solution of 13.7 g. of normal butyl bromide in 20 cc. of diethyl ether is added drop-by-drop. The mixture is left overnight with stirring and then poured on to a mixture of ice and ammonium chloride. The mixture obtained is saturated with potassium carbonate and extracted with benzene. The benzene solution is dried over anhydrous potassium carbonate and evaporated. Monobutyldimethylamine and 12.2 g. of the compound of the formula:

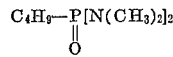

B.P.=125° C./16 mm. Hg, $d_4^{21}=0.982$, $n_D^{21}=1.4577$, are then separated by distillation under reduced pressure.

EXAMPLE 2

By the procedure of Example 1, using n-butyl tosylate instead of n-butyl bromide, an identical product is obtained.

EXAMPLE 3

By the procedure of Example 1, replacing the butyl bromide by 17.9 g. of n-heptyl bromide, heptyldimethylamine and 12 g. of the phosphonamide of the formula:

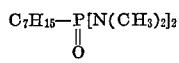

B.P.=125° C./0.2 mm. Hg, $n_D^{24}=1.4590$, $d_4^{20}=0.943$, are obtained.

EXAMPLE 4

By the procedure of Example 1, replacing the butyl bromide by 19.3 g. of n-octyl bromide, octyldimethylamine and 12 g. of the phosphonamide of the formula:

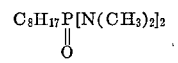

B.P.=134° C./0.75 mm. Hg, are obtained.

EXAMPLE 5

To 80 cc. of HMPT 0.2 gram-atom of sodium is added and the mixture is heated at 70° C. for one hour. After cooling to 0° C., a solution of 0.2 mol. of benzyl chloride in 50 cc. of diethyl ether is added drop-by-drop. The mixture is left overnight with stirring and then worked up as described in Example 1. Benzyldimethylamine and 40 g. of a crystalline product are obtained. The latter, after recrystallisation from a mixture of petroleum ether and ethyl acetate, melts at 127–128° C. It is the phosphonamide of the formula:

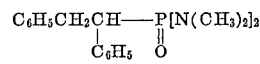

EXAMPLE 6

By the procedure of Example 5, using 0.1 gram-atom of potassium in place of the sodium, and adding 12.1 g. of allyl bromide at −60° C. in place of the benzyl chloride, allyldimethylamine and a mixture of the following two phosphonamides:

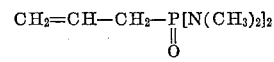

B.P. 72–77° C./0.7 mm. Hg and

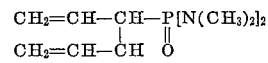

B.P. 86–88° C./0.7 mm. Hg are obtained.

I claim:

1. Process for the preparation of a phosphonamide of the formula:

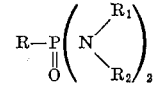

or

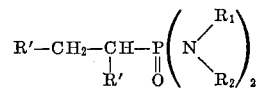

in which R is straight or branched chain alkyl of 1 to 10 carbon atoms and R' is vinyl or phenyl and $R_1$ and $R_2$ are each lower alkyl which comprises adding a reactive ester of the formula:

respectively, in which X represents a halogen atom selected from the group consisting of chlorine and bromine or a sulphuric or sulphonic ester residue selected from the group consisting of methanesulfonyloxy, ethanesulfonyloxy, and toluene-p-sulfonyloxy, and R and R' are as hereinbefore defined, to an aged solution, of an alkali metal in a triaminophosphine oxide of the formula:

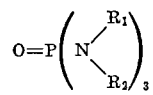

in which $R_1$ and $R_2$ are as hereinbefore defined.

2. Process according to claim 1, in which the alkali metal is first dissolved in the triaminophosphine oxide at 50° to 80° C., the solution obtained is maintained at this temperature until it has aged, and then cooled to −60° to 0° C., and the reactive ester is then added.

3. Process according to claim 1, in which $R_1$ and $R_2$ are both methyl.

4. Process according to claim 2, in which the reaction is carried out in an inert ether diluent.

5. Process according to claim 1 in which X is chlorine or bromine.

References Cited

UNITED STATES PATENTS

| 3,197,497 | 7/1965 | Mark | 260—551 |
|---|---|---|---|
| 3,075,011 | 1/1963 | Garner et al. | 260—551 |
| 3,043,821 | 7/1962 | Coover et al. | 260—89.5 |
| 2,852,550 | 9/1958 | Godfrey | 260—551 |
| 2,642,406 | 6/1953 | Dickey et al. | 260—551 |

OTHER REFERENCES

Kosolopoff et al., J. Org. Chem., vol. 21, pp. 413–14 (1956).

McCoy, J. Am. Chem. Soc. vol. 84, pp. 2246–49 (1962).

Norman, T., et al., Soc. Chim France Bull., pp. 1561–62 (May 1965).

HENRY R. JILES, Primary Examiner

HARRY I. MONTZ, Assistant Examiner

U.S. Cl. X.R.

424—320